(12) United States Patent
Rucker

(10) Patent No.: US 6,929,024 B1
(45) Date of Patent: Aug. 16, 2005

(54) THREADED DEVICE FOR REMOVING A FRACTURED CARTRIDGE FROM A VALVE BODY

(76) Inventor: Jason W. Rucker, 1031 Cochran Rd., Geneva, FL (US) 32732

( * ) Notice: Subject to any disclaimer, the term of this patent is extended or adjusted under 35 U.S.C. 154(b) by 0 days.

(21) Appl. No.: 10/839,225

(22) Filed: May 6, 2004

(51) Int. Cl.[7] .......................... F16K 51/00; B23P 19/04
(52) U.S. Cl. ................. 137/315.41; 408/231; 408/233; 29/221.6
(58) Field of Search ............ 137/315.41–315.42; 408/231–233; 29/213.1, 221.6

(56) References Cited

U.S. PATENT DOCUMENTS

| | | | |
|---|---|---|---|
| 1,382,835 A | | 6/1921 | Johnson |
| 4,097,182 A | * | 6/1978 | Rolnick ................. 408/239 R |
| 4,799,832 A | | 1/1989 | Abbott |
| 5,037,251 A | * | 8/1991 | Roth .......................... 408/222 |
| 5,573,357 A | * | 11/1996 | Mirles ....................... 408/1 R |
| 5,590,676 A | * | 1/1997 | Wagner ................... 137/15.18 |
| 5,669,404 A | * | 9/1997 | Guillermo .............. 137/315.12 |
| 5,915,741 A | * | 6/1999 | Parker ........................ 29/213.1 |
| 6,241,433 B1 | * | 6/2001 | Rydberg et al. ............ 408/233 |
| 6,643,904 B1 | | 11/2003 | Hedspeth |

* cited by examiner

*Primary Examiner*—Kevin Lee
(74) *Attorney, Agent, or Firm*—Julian C. Renfro, Esq.

(57) ABSTRACT

An improvement for use with a hand operated wrench primarily intended for removing a cartridge from an opening, with such wrench having a slotted aperture at one end. This improvement comprises an elongate threaded device having a mounting shaft at one end, and tapered external threads at the other end, with an internally threaded hole extending partly along the length of the device. This mounting shaft is sized to be inserted into the apertured end of the wrench, with flattened shoulders on the shaft able to closely engage the slotted aperture of such wrench to prevent undesired rotation. The internally threaded hole is engagable by an elongate screw associated with the wrench, to prevent undesired separation during use. The external threads of the elongate device are of a diameter for tightly engaging and removing a fractured cartridge from an opening, such as in a valve body.

7 Claims, 3 Drawing Sheets

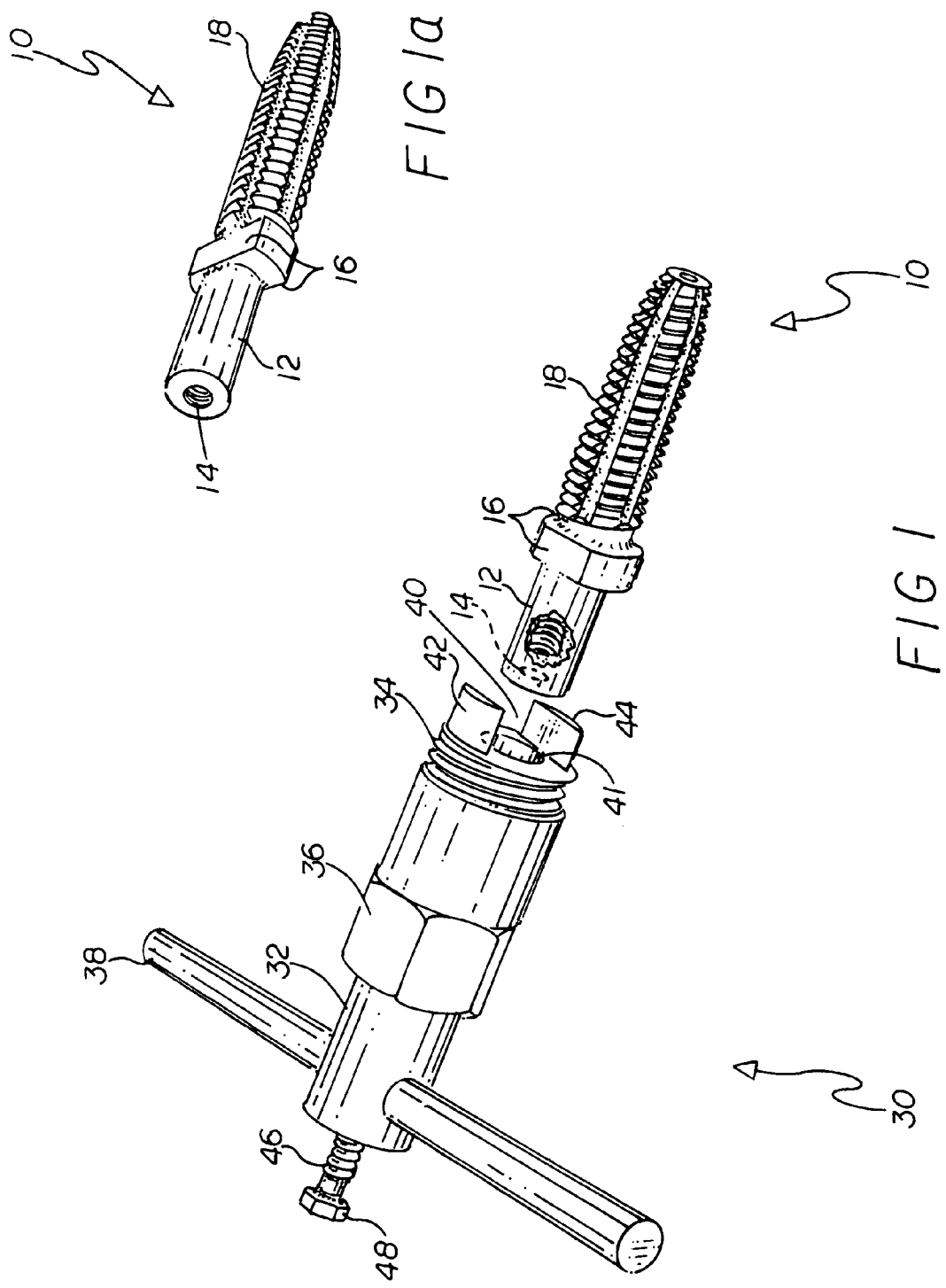

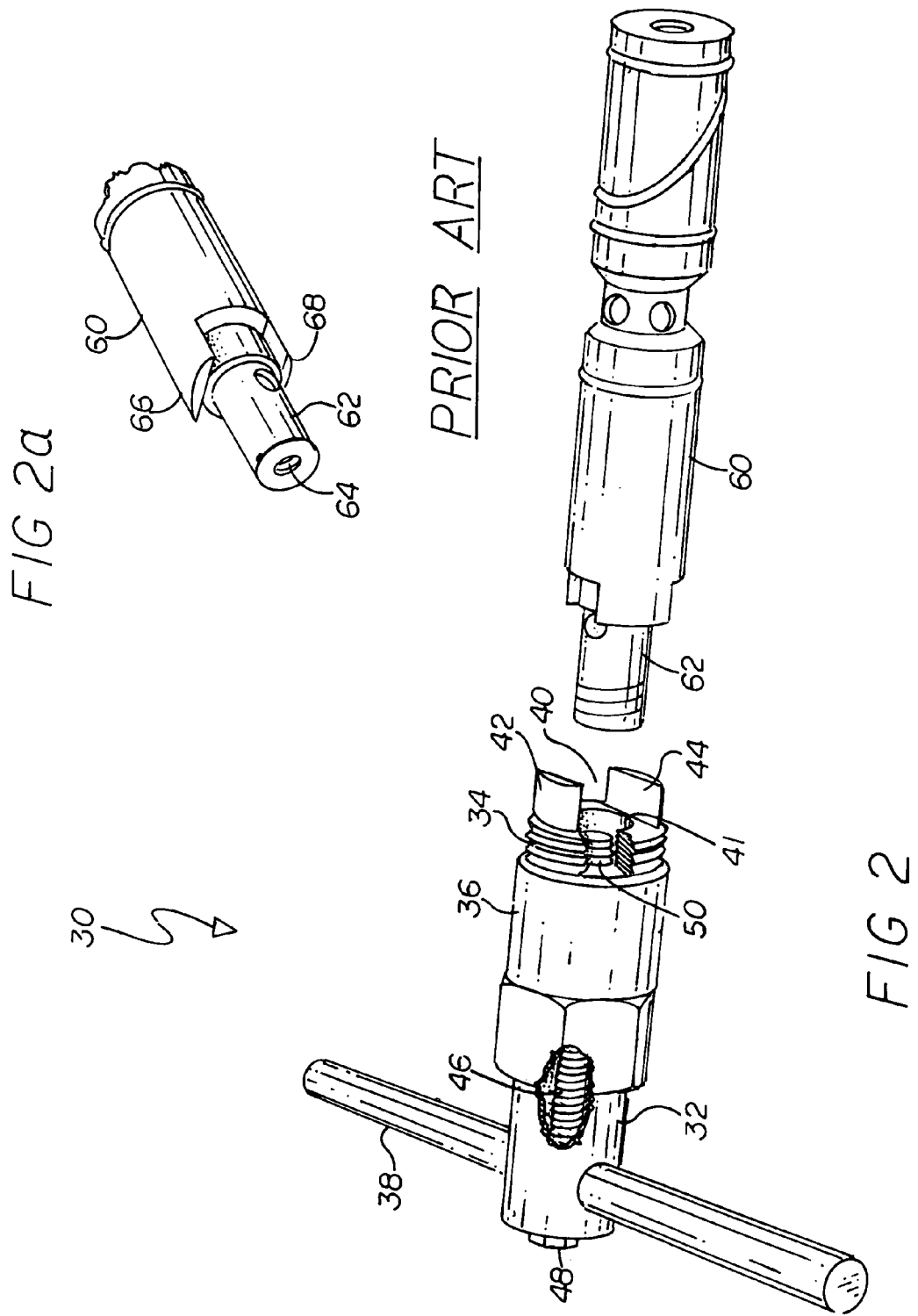

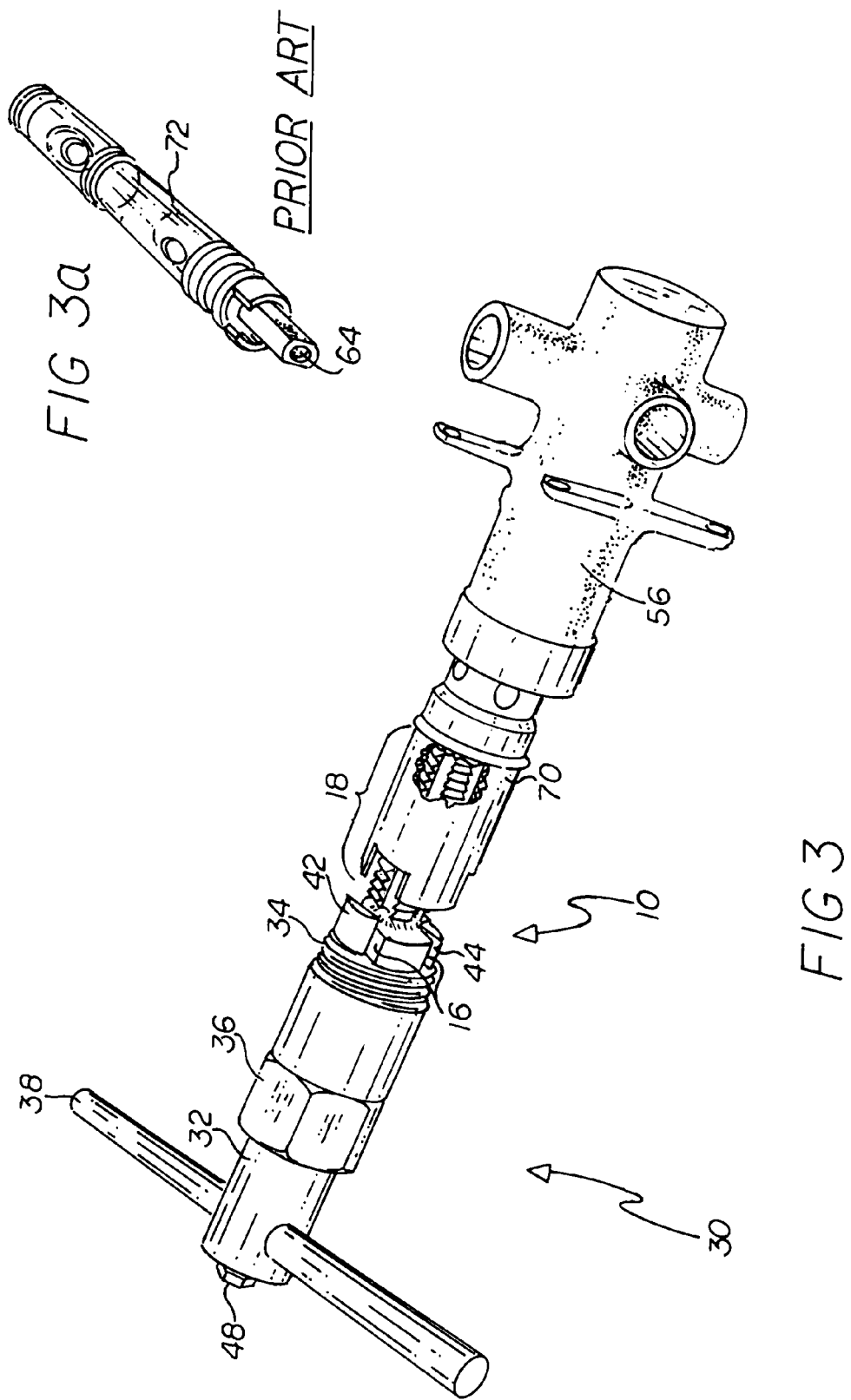

THREADED DEVICE FOR REMOVING A FRACTURED CARTRIDGE FROM A VALVE BODY

BACKGROUND OF THE INVENTION

It is well known that so called single-handle faucets are utilized in sinks, lavatories, showers and tubs in many homes. In such a faucet, the handle of the faucet is lifted to cause the flow of water to commence, with the handle thereafter being pushed down to cause the flow volume to diminish, or to shut off entirely. In addition, moving the handle to one side, such as to the left, brings about the flow of hot water, whereas moving the handle to the right typically causes the flow of cold water to commence. With a bit of experimentation with regard to movements of the faucet handle, the user can relatively easily bring about the desired volume of water, and at the desired temperature, flowing from the faucet.

One manufacturer of faucets, including single-handle faucets, is Moen Incorporated of North Olmsted, Ohio. Inside the valve body of a Moen single-handle faucet is a cartridge, such as a cartridge manufactured under U.S. Pat. Nos. 3,840,048, 3,916,950 or 4,330,011.

Typically, such a cartridge is slightly under ¾" in diameter and approximately 4" in length, being made of brass or plastic. A plurality of apertures are located in the exterior of such a cartridge, and a plurality of O-rings are arrayed around the circumference of the cartridge. This arrangement is utilized in order to prevent leakage occurring between the cartridge and the interior of the valve body in which the cartridge is operatively mounted.

Slidably yet relatively tightly mounted inside the cartridge is a stem having apertures at preestablished locations therein, which can on occasion be caused to line up with apertures in the cartridge. The volume of water flowing from the faucet in which the cartridge is utilized, as well as the temperature of the water, is determined by the relationship of the apertures of the stem with respect to the apertures in the cartridge in which the stem is mounted. At the top of the stem is an internally threaded connector, which enables a desired connection to be made to the faucet handle.

Because of the above-described arrangement, when the faucet handle is lifted, the stem is caused to move up with respect to the cartridge, to cause the flow of water to commence. Movement of the faucet handle to the left or to the right causes rotation of the stem, which in turn causes hot water or cold water to flow from the faucet, in accordance with the user's positioning of the faucet handle. All of this is well known.

From time to time, a faucet may begin to leak, which may occasion the cartridge and its stem being removed from the valve body. That this may be readily accomplished, Moen provides a "T" shaped cartridge removal tool that can be used to engage the stem of the faulty cartridge after the faucet handle has been removed. A handle is located at one end of this "T" shaped tool, with the other end of the tool being configured to engage the end of the cartridge. An elongate screw loosely disposed along the centerline of the tool body represents an intrinsic part of the T-shaped tool, with the threaded inner end of the elongate screw being able to threadedly engage the internally threaded connector located at the upper end of the previously mentioned stem.

The proper engagement of the cartridge removal tool with the stem of the cartridge enables the plumber or other user of the tool to grasp the handle of the tool firmly, and then proceed by a rotating, pulling motion to cause the faulty cartridge to be withdrawn from the valve body. In most instances this procedure takes place without incident, following which the new cartridge can be installed into the valve body.

From time to time however, the cartridges fails or fractures during the withdrawal procedure, meaning that, for example, only the stem portion of the faulty cartridge is removed from the valve body. Quite unfortunately, this permits some or all of the outer portion of the cartridge to remain in an interior portion of the valve body.

In many instances it is quite difficult to remove the fractured portion of the cartridge remaining in the valve body, with this causing the plumber to improvise an arrangement for removing the remaining, dismembered portion of the cartridge. The plumber may use a screwdriver, needle-nose pliers, a tap, or other such tool in an attempt to grasp and remove the fractured cartridge portion. This is not only an inexact, time consuming procedure, but also there is a distinct risk of the interior of the valve body being damaged. It is a fact that if the interior of the body becomes scratched or scarred, there is a distinct risk of undesirable leakage occurring after the replacement cartridge is in place in the valve body.

It is therefore obvious that if the function of the conventional T-shaped cartridge removal tool could be extended to permit a dismembered cartridge to be engaged and then readily removed, the task of the plumber could be greatly simplified. It was in an effort to enable such an expanded role for the conventional T-shaped tool that the present invention was evolved.

I am aware of the existence of certain tools having some similarity to the conventional T-shaped cartridge removal tool with which my novel elongate threaded device is intended to be used. For example, the Johnson U.S. Pat. No. 1,382,835 entitled "Bushing Tool" involves a device involving a T-shaped handle, to which is attached a tapered, externally threaded component.

The Abbott U.S. Pat. No. 4,799,832 entitled "Ratchet Tap Wrench" teaches a device having a T-shaped handle having jaws 71 for engaging three or four tap shank sizes.

The Hedspeth U.S. Pat. No. 6,643,904 entitled "Shank Removal Tool for a Carburetor" is somewhat relevant, but the Hedspeth device has no capability for removal of a faulty cartridge from a valve body, and its utilization could not be increased to accommodate an elongate threaded member for utilization should a cartridge fracture during the cartridge removal procedure.

It is clear that an improved device is needed for utilization with the conventional cartridge removal wrench or tool, for improving and expanding upon the utilization of such tool.

SUMMARY OF THE INVENTION

An elongate threaded device has been provided in accordance with this invention, designed to be utilized in conjunction with a hand operated wrench known as a cartridge removal tool. This novel elongate threaded device is intended for the removal of a fractured or dismembered cartridge from an opening or aperture, such as from a valve body. This device has a mounting shaft at one end, and a series of external threads at the other end, with the mounting shaft being generally circular and having a diameter smaller than the diameter of the external threads. An internally threaded hole is located on the centerline of the mounting shaft, which hole extends from the mounting shaft end of the device for a considerable distance along the length of the device. A pair of flattened shoulders are located closely adjacent the mounting shaft, with the mounting shaft being sized to be inserted into one end of the conventional cartridge removal tool. These flattened shoulders are able to closely engage a slotted portion located in the end of such tool or wrench, with the internally threaded hole being engagable by the elongate screw operatively associated with the conventional tool, to prevent undesired separation of my novel device from the tool during use.

Significantly, the flattened shoulders prevent rotation of the mounting shaft with respect to the tool during utilization of the novel device for engaging and removing a fractured or dismembered cartridge from a valve body. The external threads of the novel device may be tapered, and are of a diameter for tightly engaging the fractured cartridge to be removed during rotation of the hand-operated tool.

It is a principal object of this invention to provide a novel elongate threaded device readily usable with a conventional cartridge removal tool, for considerably expanding and extending the use of the cartridge removal tool.

It is another object of this invention to provide a novel elongate threaded device having a mounting shaft at one end, and a series of external threads at the other end, with this novel device being usable in conjunction with a conventional cartridge removal tool in order to make possible, the engagement of the fractured or dismembered portion of a cartridge remaining in a valve body, with the subsequent removal of the fractured or dismembered cartridge thereafter becoming a relatively simple task.

It is yet another object of this invention to provide a simplified, inexpensive component for use, on occasion, with a cartridge removal tool, so that the dismembered portion of the faulty cartridge residing in a valve body can be easily engaged and then removed, without risking scratching or otherwise damaging the inner surfaces of a valve body, as often occurred when an improvised procedure was utilized by a plumber or other user in removing a fractured cartridge.

These and other objects, features and advantages will become more apparent as the description proceeds.

BRIEF DESCRIPTION OF DRAWINGS

FIG. 1 is an illustration of my novel elongate threaded device, viewed in exploded relation with regard to a conventional T-shaped cartridge removal tool, of the type with which my novel device can be readily used;

FIG. 1a is a perspective view of my novel elongate threaded device as observed from a slightly different angle;

FIG. 2 is a perspective view of the same conventional T-shaped cartridge removal tool, viewed in exploded relation with regard to a conventional cartridge for a single handle faucet, with this view being captioned PRIOR ART, and with part of the body of the tool being fractured away to reveal a portion of the elongate screw utilized to affix the tool to a conventional cartridge for the purpose of the removal of same;

FIG. 2a is a perspective, fragmentary view of the end of the conventional cartridge, illustrating how the stem portion of the cartridge can be threadedly engaged by the elongate screw contained in the body of the conventional T-shaped cartridge removal tool;

FIG. 3 is a perspective view of the same conventional T-shaped cartridge removal tool, to which my novel elongate threaded device has been removably attached, with the external threads of my novel elongate threaded device being shown in firm engagement with the interior of a fractured cartridge being removed from a valve body; and FIG. 3a is perspective, fragmentary view of the end of a conventional cartridge of the plastic type, revealing the threaded end able to be removably connected to the conventional cartridge removal tool, by the use of the central screw of the tool, with this view being captioned PRIOR ART.

DETAILED DESCRIPTION

With initial reference to FIG. 1, it will be noted that I have illustrated a novel, elongate, externally threaded device 10, that is intended for use with a hand operated wrench or tool 30. The novel elongate device 10, in conjunction with such a hand operated wrench or tool, is to be utilized for the removal of a dismembered cartridge from an opening or aperture, such as from a valve body.

The hand operated wrench 30 is of known construction, forming no part of the present invention, and it may also be referred to herein as a cartridge removal tool. If during attempted removal of a faulty cartridge from a valve body, the cartridge breaks or fractures, a sometimes quite difficult procedure for removing the dismembered portion of the cartridge from the valve body must be attempted. As will shortly be explained, my novel elongate device 10 is ideally suited for broken cartridge removal, after my novel device 10 has been removably attached to the wrench or tool 30.

As will be noted from FIG. 1, my novel elongate device 10 has a mounting shaft 12 at one end, and a series of external threads 18 at the other end. The threads preferably possess a taper, similar to the taper of a typical tap used for creating threads in a hole. The mounting shaft 12 is generally circular in cross section, and has a diameter that usually is smaller than the diameter of the external threads 18. An internally threaded hole 14 is located on the centerline of the mounting shaft 12, which hole extends from the end of the mounting shaft for a considerable distance along the centerline of the elongate device 10, toward the external threads 18.

As will be noted from FIG. 1, and perhaps more clearly from FIG. 1a, a pair of flattened shoulders 16 are located closely adjacent the mounting shaft 12, disposed between the mounting shaft 12 and the external threads 18. It is to be understood that the mounting shaft 12 is sized to be inserted into a cavity 41 located in one end of the body portion 32 of the hand operated wrench or cartridge removal tool 30. As will become more clear as the description proceeds, the flattened shoulders 16 of the novel device 10 are able to closely engage a slotted portion 40 defined between a pair of protuberances 42 and 44 mounted in a spaced relationship to the cavity 41.

Interaction of the flattened shoulders 16 with the end of the wrench 30 prevents undesired rotation of my novel elongate device 10 when it is being used as an important adjunct to the wrench 30.

With additional attention now to the cartridge removal tool 30 as depicted in some detail in FIGS. 1 and 2, this is a device of known construction, specifically designed to facilitate removal of a faulty cartridge, such as one manufactured by Moen, from a valve body. The body portion 32 of the tool 30 is typically made of steel, having a threaded exterior 34, upon which a comparatively large nut 36 is threadedly mounted.

A sturdy handle 38 is mounted at the upper end of the wrench or tool 30, located in a 90° relationship to the body portion 32, intended to enable a plumber or other person to rotate the cartridge 180° left or right, as well as apply a pulling motion to withdraw the faulty cartridge from a valve body when the cartridge has been firmly engaged.

As previously mentioned, the end of the tool 30 remote from the handle 38 has a cavity 41 associated with the slotted portion 40, with a pair of protuberances mounted in a spaced relationship to the cavity. The basic design of the tool 30 involves the protuberances 42 and 44 spaced so as to be able to engage the notched end of the cartridge 60 illustrated in FIG. 2 and in FIG. 2a.

It should now be abundantly clear that the wrench or cartridge removal tool 30 per se is not a part of this invention, but is being illustrated in order to form a clear basis for understanding the construction and usage of the present novel elongate device 10.

An elongate screw 46 of relatively small diameter is loosely mounted on the centerline of the body portion 32 of the tool or wrench 30. This elongate screw 46, provided by the manufacturer of the tool 30, has a head 48 located adjacent the handle 38, with this screw being provided for utilization at the time a faulty cartridge is to be removed from a valve body. It is to be seen in FIG. 2 that a portion of the end of the tool body 32 has been sectioned away to reveal that the end of the screw 46 has a threaded end 50, with this screw being of sufficient length as to extend into the end of cavity 41.

As will be seen in FIG. 2, which is labeled PRIOR ART, the cartridge 60, here a brass cartridge, is provided with an internally-threaded stem 62; note FIG. 2a wherein internal threads 64 are illustrated. In connection with a faucet, such as a kitchen faucet of the type having an elongate handle, the stem 62 is lifted and caused to rotate to the left inside the cartridge when the faucet handle is turned to the left to call, for example, for hot water. Also to be understood is the fact that the stem is caused to lift and rotate to the right when the faucet handle is turned to the right to call for cold water. It additionally is to be recognized that when the faucet handle is lifted to call for a greater volume of water, the stem 62 is caused to move upwardly, whereas when the handle is moved in the downward direction, it causes the stem to move downwardly, to accomplish a diminishment of the flow of water from the faucet.

When a cartridge 60 inside a faucet has proven to be faulty and is to be replaced, removal of the faucet handle components by the plumber causes the end of the valve body to be exposed, making the end of the stem 62 of the cartridge available to be engaged by the external threads 50 of the elongate screw 46. The screw forms an intrinsic part of the cartridge removal tool 30, with the threads 50 on the end of the screw able to engage the internal threads 64 in the end of the stem 62. In the normal procedure, after a retention nut and/or clip has been removed from the faucet by the plumber, the threads 50 at the end of the elongate screw 46 of the tool 30 are brought into threaded contact with the internal threads 64 in the end of the stem 62 of the faulty cartridge to be replaced. At this time the screw 46 is rotated by means of a wrench applied to the head 48 of the screw, so that the stem 62 will be threadedly engaged by the threads 50. The plumber or other user then proceeds to tighten the head end 48 of the elongate screw 46 so as to draw the protuberances 42 and 44 of the wrench or tool 30 into close contact with the slotted end of the cartridge 60.

From FIG. 2a it will be noted that the upper end of the cartridge 60 has spaced protuberances 66 and 68 to define a slotted portion, which slotted portion is of a dimension to receive the protuberances 42 and 44 located on the end of the tool 30. After the protuberances 66 and 68 of the cartridge 60 have been properly aligned with the slotted end of the tool 30, the elongate screw 46 can then be tightened so as to bring the cartridge 60 into firm contact with the slotted portion of the cartridge removal tool 30.

The engagement of the tool 30 with the internally threaded end 64 of the stem 62 of the cartridge 60 means that the plumber or other user of the tool can now grasp the handle 38 firmly, and then proceed by a rotating, pulling motion to cause the cartridge 60 to be withdrawn from the valve body. Also, a large nut 36 can assist by being tightened into contact with the valve body, to apply pressure to help with the pulling motion. In most instances this procedure takes place without incident, following which the new cartridge can be installed into the valve body.

From time to time however, the cartridge fails or fractures during the withdrawal procedure, meaning that only the stem portion 62 of the cartridge 60 is removed from the valve body. Quite unfortunately, this permits part or perhaps all of the outer portion of the cartridge 60 to remain in an interior portion of the valve body.

In accordance with the prior art, the plumber or other user at this point usually improvises an arrangement for removing the dismembered cartridge. A first attempt may involve the use of needlenose pliers, but failing that, the plumber or other user will then endeavor to thread some sort of a device into the interior of the dismembered remnant of the cartridge. When the dismembered cartridge has been firmly engaged in accordance with this improvised arrangement, the dismembered cartridge end presumably can be withdrawn from the valve body. Unfortunately, some damage to the inner sidewalls of the valve body can take place during the utilization of an improvised procedure.

A vast improvement over this improvised procedure of the prior art for removing a dismembered cartridge is made possible in accordance with this invention. Quite significantly, scarring or other damage to the interior of the valve body is completely avoided by the use of my novel device 10. As will be readily understood, the tapered external threads 18 of my novel device 10, which is of hardened steel, will in effect serve to cut some threads on the interior of the dismembered portion of the cartridge, thus providing a firm grip on the dismembered cartridge portion, and enabling it to be withdrawn from the valve body. It is important to note that the external threads 18 never come into contact with the interior of the valve body, completely sparing it from scarring during this procedure.

In FIG. 3 it will be noted that I have shown my novel elongate threaded device 10 having been removably attached to the end of the cartridge removal tool by the use of the elongate screw 46. Obviously the internally threaded hole 14 is deep enough to receive a substantial number of the threads 50 located at the end of the screw 46. It will be noted at this time that the flattened shoulders 16 of my novel device have been received between the spaced protuberances 42 and 44 on the end of the cartridge removal tool. Most important to be noted is that the external threads 18 of my novel elongate threaded device are shown in firm engagement with the interior of a dismembered cartridge 70 being removed from a valve body 56, as a result of the previously mentioned thread cutting action.

FIG. 3a is a perspective view of the end of a conventional cartridge, here a plastic cartridge 72, revealing the threaded end able to be removably connected to the conventional cartridge removal tool, by the use of the loosely fitted elongate screw 46 of the tool.

It should now be clear that my herein described novel, elongate, externally-threaded device 10 expands and enlarges the utilization of the conventional hand operated wrench 30, making it possible for the conventional wrench to be usable for removing the fractured portion of a cartridge remaining in a valve body after the stem 62 has separated from the cartridge and has been withdrawn.

After the withdrawal of the dismembered portion of the cartridge from the valve body 56 has been accomplished, my novel elongate device 10 can be quickly removed from the tool 30 by unscrewing the elongate screw 46, thus readying both of these components for reuse at such time as needed. Obviously, the dismembered cartridge portion is to be discarded.

I am not to be limited to any particular length of my novel externally threaded devices 10, but by way of example, when a dismembered brass cartridge is to be removed, the elongate externally threaded device I prefer to use may have an overall length of approximately 2¾ inches, with the length of the threads being approximately 1½ inches. When, however, the dismembered cartridge is plastic, the novel threaded device I prefer to use may have an overall length of 2 inches, with the length of the threads being 1 inch. Also by way of example, the external threads may be approximately ½ inch in diameter, and involve on the order of thirteen threads to the inch. The external threads may be tapered, with the tip of the device being of small enough diameter as to enable it to easily enter a dismembered cartridge.

My basic novel, inexpensive device 10, readily utilized with conventional hand operated wrenches, represents a very useful addition to the plumber's toolbox.

I claim:

1. For use with a hand operated, cartridge-removal wrench having an aperture at one end defining a slotted portion, an elongate threaded device having a mounting shaft at one end, and a series of external threads at the other end, said mounting shaft being generally circular and having an internally threaded hole located on its centerline, which hole extends from said mounting shaft end of said device for a considerable distance along the length of said device, said mounting shaft sized to be inserted into the apertured end of the hand operated wrench, with means on said device able to closely engage the slotted portion of such wrench, said internally threaded hole being engagable by an elongate screw, to prevent undesired separation of said elongate device from the wrench during use, with said means preventing rotation of said mounting shaft with respect to the wrench during use of said elongate device, said external threads of said device being of a diameter for tightly engaging a faulty cartridge to be removed during utilization of the wrench.

2. The elongate threaded device usable with a hand operated wrench as defined in claim 1 in which said means are located on said mounting shaft, and involve a pair of flattened shoulders.

3. The elongate threaded device usable with a hand operated wrench as defined in claim 1 in which said shaft has a diameter smaller than the diameter of said external threads.

4. An elongate threaded device usable with a hand operated cartridge removal-wrench having an apertured end, said elongate device having a mounting shaft at one end, and a series of external threads at the other end, said mounting shaft being generally circular and having a diameter smaller than the diameter of said external threads, an internally threaded hole located on the centerline of said mounting shaft, which hole extends from the mounting shaft end of said elongate device for a considerable distance along the length of said elongate device, said mounting shaft sized to be inserted into the apertured end of such hand operated wrench, with means on said elongate device able to closely engage a portion of the apertured end of such wrench, said internally threaded hole being engagable by an elongate screw utilized for preventing undesired separation of said elongate device from the wrench during use, with said means preventing rotation of said mounting shaft with respect to the wrench during use of said elongate device, said external threads of said elongate device being of a diameter for tightly engaging a dismembered cartridge portion to be removed from a valve body during utilization of the wrench.

5. The elongate threaded device usable with a hand operated wrench as defined in claim 4 in which said means involves a pair of flattened shoulders located on said mounting shaft.

6. An improvement for use with a hand operated wrench that is primarily intended for the removal of a cartridge from an opening or hole, the wrench having an aperture bounded by components defining a slotted portion at one end, and an elongate screw residing in a part of the wrench and operatively associated with the wrench, the screw having a portion capable of extending at least partially through the aperture, said improvement comprising an elongate threaded device having a mounting shaft at one end, and a series of external threads at the other end, an internally threaded hole located on the centerline of said mounting shaft, which hole extends from said mounting shaft end of said device for a considerable distance along the length of said device, and a pair of flattened shoulders located closely adjacent said mounting shaft, said mounting shaft sized to be inserted into the apertured end of the hand operated wrench, with said flattened shoulders able to closely engage the slotted portion of such wrench, said internally threaded hole in said mounting shaft being engagable by the elongate screw of the wrench, to prevent undesired separation of said device from the wrench during use, with said flattened shoulders preventing rotation of said mounting shaft with respect to the wrench during use of said device, said external threads of said elongate device being of a diameter for tightly engaging a dismembered cartridge to be removed from a valve body during rotation of the wrench.

7. The elongate threaded device as recited in claim 6 in which said external threads are tapered, with the smallest diameter of said threads being at the outer tip.

* * * * *